(12) United States Patent
Hernacki et al.

(10) Patent No.: US 7,886,200 B1
(45) Date of Patent: Feb. 8, 2011

(54) MEASURING CATASTROPHIC FAILURE RATES IN UPDATES

(75) Inventors: Brian Hernacki, Cupertino, CA (US); William E. Sobel, Cupertino, CA (US)

(73) Assignee: Symantec Corporation, Cupertino, CA (US)

( * ) Notice: Subject to any disclaimer, the term of this patent is extended or adjusted under 35 U.S.C. 154(b) by 372 days.

(21) Appl. No.: 12/053,491

(22) Filed: Mar. 21, 2008

(51) Int. Cl.
*G06F 11/00* (2006.01)
(52) U.S. Cl. .......................................... 714/48; 714/38
(58) Field of Classification Search .................. 714/48, 714/37–39, 40, 47; 717/124, 126, 128
See application file for complete search history.

(56) References Cited

U.S. PATENT DOCUMENTS

| 7,451,003 | B2* | 11/2008 | Chester et al. ................. 700/28 |
| 7,523,357 | B2* | 4/2009 | Irby et al. ...................... 714/47 |
| 2004/0058699 | A1* | 3/2004 | Jonsson et al. ............... 455/522 |
| 2007/0044096 | A1* | 2/2007 | Choe .......................... 717/178 |
| 2009/0158261 | A1* | 6/2009 | Gielniak et al. ............. 717/147 |

OTHER PUBLICATIONS

H. Debar et al., "The Intrusion Detection Message Exchange Format (IDMEF)", Request for Comments 4765, Internet Engineering Task Force (IETF), Mar. 2007, 132 pages, [online] [Retrieved on Feb. 28, 2008] Retrieved from the Internet <URL:ftp://ftp.rfc-editor.org/in-notes/rfc4765.txt>.

"How WER Collects and Classifies Error Reports", Microsoft Corporation, 3 pages, [online] [Retrieved on Feb. 28, 2008] Retrieved from the Internet <URL:http://www.microsoft.com/whdc/maintain/WER/ErrClass.mspx>.

"Privacy Statement for the Microsoft Error Reporting Service", Oct. 10, 2005, Microsoft Corporation, 2 pages, [online] [Retrieved on Feb. 28, 2008] Retrieved from the Internet <URL:http://oca.microsoft.com/en/dcp20.asp>.

Watchdog—O—Matic Web Page, kwakkelflap.com, 1 page, [online] [Retrieved on Feb. 28, 2008] Retrieved from the Internet <URL:http://www.kwakkelflap.com/watchdog.html>.

* cited by examiner

*Primary Examiner*—Dieu-Minh Le
(74) *Attorney, Agent, or Firm*—Fenwick & West LLP

(57) ABSTRACT

Preventing continued distribution of a software update that is causing problems in computers is a challenging problem, particularly where the update causes a catastrophic failure such that the problem cannot be reported by the computer since the computer has been completely disabled. To manage this problem, when an update is delivered for installation, it first installs a program and configures it to execute at a specified reporting time. When that time is reached, the program sends a positive operations notification to the update server indicating that the program is okay or sends a notification that the program is okay so far, but the user is now shutting down the computer. The number of notifications received is tracked by the system in comparison to the number of software updates sent. If the notifications received are smaller than expected, the update may be causing catastrophic failures in the computers, preventing the sending of the notification, and thus the system can take corrective action to manage this problem early on, before more problematic updates are sent out.

17 Claims, 5 Drawing Sheets

MEASURING CATASTROPHIC FAILURE RATES IN UPDATES

BACKGROUND OF THE INVENTION

1. Field of the Invention

This invention pertains in general to computer security, and more specifically to measuring catastrophic failure rates caused by a software update.

2. Description of the Related Art

Many applications and operating system now frequently support automatic updates. However, deploying a software update to a large number of users at a time can pose numerous problems since such updates sometimes introduce software bugs or cause other problems when released to the public. If an update contains a bug that will adversely affect the target systems to which the update was deployed, it is important for the sender of the update to become aware of this problem as soon as possible to mitigate the impact of this bug. Ideally, the sender of the update would like to know before the update is widely distributed to numerous target systems so that the problem can be corrected before a large number of systems are affected.

There are some existing approaches that monitor the application on the target system after the update to that application has been sent. These approaches provide methods for reporting back to a server crashes and other errors due to the update. Some of these approaches require user input, for example, requiring that the user provide information about problems experienced with the application. Others use a more automated system of monitoring and reporting errors. However all of these approaches fail to effectively manage catastrophic failures, such as those that cause the entire system to crash and prevent rebooting. If an update (e.g. an OS update) disables the system so that it can no longer boot, or disables the network access, the system cannot send any sort of report regarding problems that may have occurred with the update. Thus, systems that require the application or the user to report back to the server any problems experienced will fail because the report cannot be sent. Since the issue is not reported, the server believes there is no problem with the update and continues to send this update to additional computers, potentially causing further catastrophic failures and allowing the problem to spread.

Therefore, there is a need in the art for a system and method for determining whether a catastrophic failure (e.g., system disabling error) has occurred after receipt of the update, and for metering updates and correcting for such errors

DISCLOSURE OF INVENTION

The above need is met by an update control module for measuring a catastrophic failure rate (e.g., a failure or an error in the computer that prevents the computer from being able to send out operations notifications after the update is installed) in software updates. A sending module sends software updates to a plurality of computers. The software updates install update check programs on each of the computers and configure the update check programs to execute at a specified reporting time after the update check program installation. A receiving module receives from a plurality of the update check programs a positive operations notification at the specified reporting time indicating that the update check programs are okay. A tracking module tracks the number of positive operations notifications received in comparison to the number of the software updates sent. A failure determination module determines whether the software updates sent are causing catastrophic failures in the computers based on results of the tracking. The failure determination module can also be configured to determine whether or not the number of positive operations notifications received is small in comparison to the number of software updates sent, possibly indicating a high catastrophic failure rate for the software updates. In response, the module can prevent the software updates from being sent to additional computers.

In some embodiments, the update check program is configured to send a plurality of positive operations notifications at a plurality of specified reporting times separated by time intervals. The notifications can end after a defined period of time. In some embodiments, the positive operations notification received is a partial positive operations notification indicating that the update check programs are okay so far. Such a partial notification might be sent immediately before the computer is temporarily disabled by the user (e.g., the computer is shut down or disconnected from the network, etc.).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The update control module 140 monitors performance of a software update sent to multiple computers by determining whether a catastrophic failure has occurred due to the updates sent. As used herein, the term "catastrophic failure" can include an error or failure in the computer receiving the update that results in the computer being unable to send out any type of operations notifications (e.g., to the update server that sent the update). Typically, the catastrophic failure is an error in the computer that disables the system in some manner. For example, the error can result in the computer crashing and being unable to reboot after crashing, in disabling of network access, and so forth.

In brief, the update control module 140 can be executed on an update server that sends software updates to a number of client computers. The updates can install update check programs on the computers that can each act as a timer and send out a positive operations report at a particular time after installation of the program indicating that everything is okay. The update server can track the number of notifications received versus the number of updates sent to determine whether there are likely any problems in the update. If the update is causing catastrophic failures in the computers, the update check program will be unable to send a notification at the designated time. If the module 140 is not receiving the expected number of notifications from the update check programs, then the module 140 can take action to prevent further sending out of that update.

Figure 1:
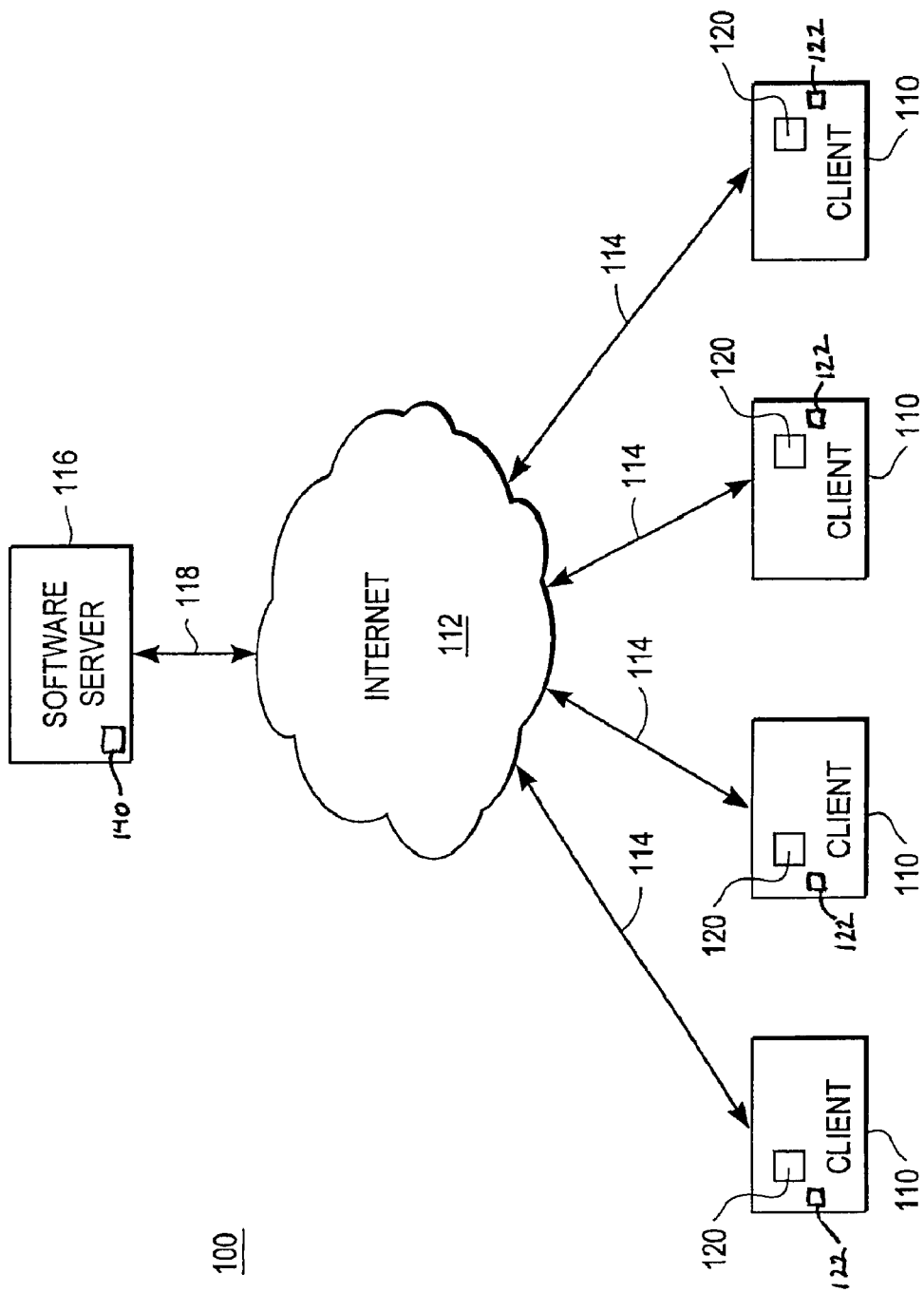
FIG. 1 is a high-level block diagram illustrating an example of a standard computing environment 100, according to one embodiment of the present invention.

FIG. 1 is a high-level block diagram illustrating a computing environment 100 according to an embodiment of the present invention. Multiple client computers 110 are in communication with a computer network 112, such as the Internet or other network, such as a local area network, wide area network, etc. via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having connectivity to remote update sources, such as cellular telephones, personal digital assistants (PDAs), etc. A server 116 is also connected to the Internet 112 via a communications link 118.

As is known in the art, the client computers 110 preferably execute an operating system and one or more application programs. The operating system controls the operation of the computer system, and some examples of such an operating system include LINUX®, one of the versions of MICROSOFT WINDOWS®, and PALM OS®.

In FIG. 1, each client computer 110 is connected to the Internet 112 via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to connect to the computer network. In still other embodiments, the communications link 114 connects the client computer 110 via a wireless 802.11, Bluetooth, or mobile phone (e.g., CDMA or GSM) network, satellite downlink, uplink, or bi-directional link, etc. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can be an update server for sending software updates across the Internet 112 and to the client computers 110. The server 116 executes an update control module 140 for measuring catastrophic failure rates of updates sent. The update control module 140 can be a discrete application program, or the module 140 can be integrated into another application program or operating system. In some embodiments, a portion of the update control module 140 is executed on the client computers 110. For example, the update check program can be a portion of the module 140. As another example, the installation of the update check program could be managed by a portion of the update control module 140. The server 116 can not only sent updates to the computers 110, but it can also receive information across the Internet 112 from the computers 110. For example, the server 116 might receive operations notifications from the computers 110 indicating whether there have been any problems since the update was sent. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, the update 120 received across the Internet 112 by each client computer 110 from the update server 116 is installed on the computers 110. In this embodiment, the update 120 installs the update check program 122, which is configured to send one or more operations notifications at designated times to the update server 116. Though the clients 110 are shown as being connected to the Internet 112, in some embodiments the clients 110 are only connected to the Internet 112 for a certain period of time or not at all. For example, if a catastrophic failure occurs in the computers 110, network access may be disabled. However, it is also possible for the computers 110 to become temporarily disconnected from the network (e.g., a user shuts down the computer 110, the network goes down temporarily, etc.). Other modifications can be made to accommodate any of the other numerous embodiments of the update control module 140.

Figure 2:
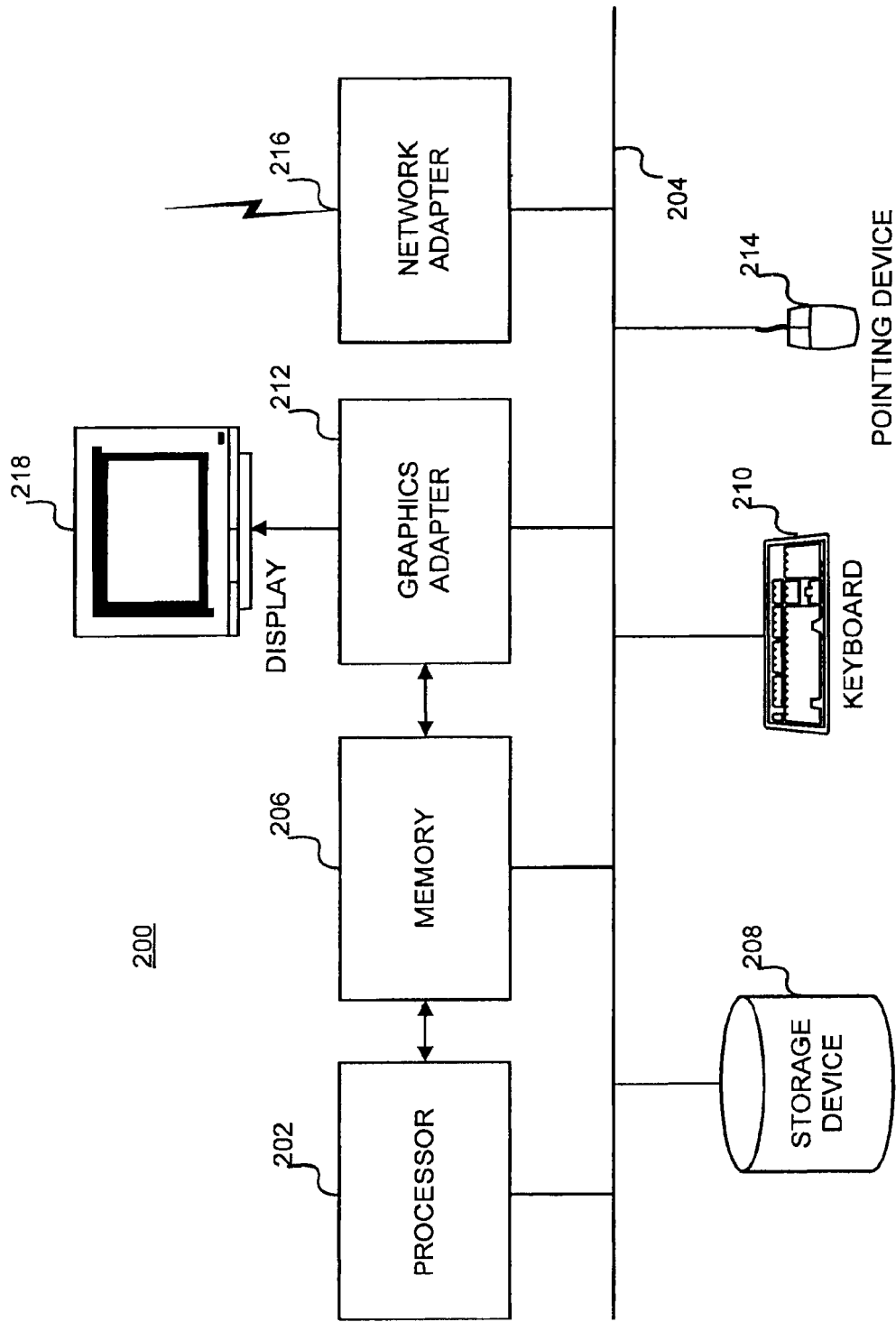
FIG. 2 is a high-level block diagram illustrating a standard computer system 200 for use with the present invention.

FIG. 2 is a high-level block diagram illustrating a functional view of a typical computer system 200 for storing and executing the update control module 140, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules are stored on the storage device 208, loaded into the memory 206, and executed by the processor 202. Alternatively, hardware or software modules may be stored elsewhere within the computer system 200. Similarly, a computer program product comprising a computer-readable medium (e.g., a CD-ROM, a tape, a DVD, memory, flash memory, etc.) containing computer program code for performing functionalities described here is contemplated.

Figure 3:
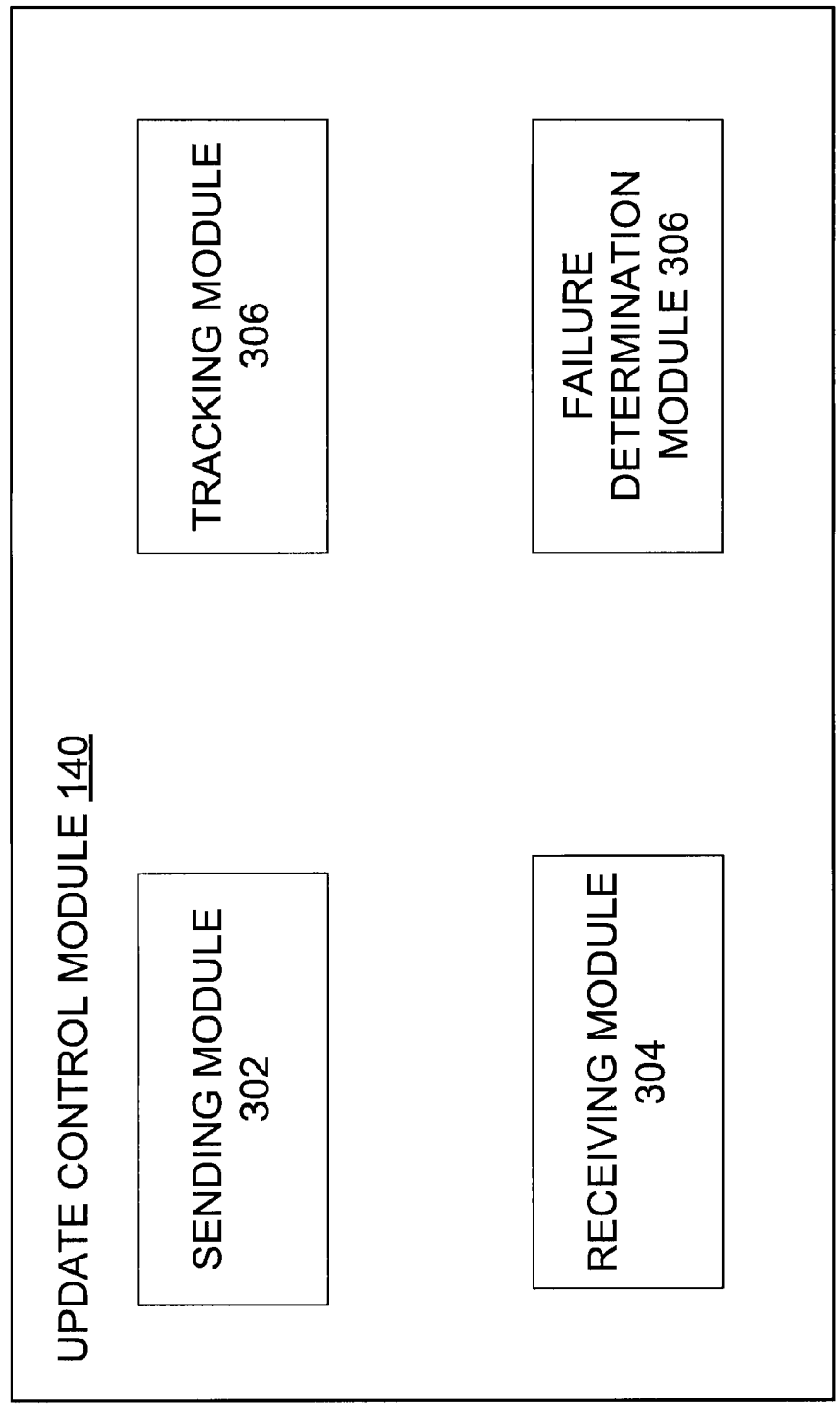
FIG. 3 is a high-level block diagram illustrating the functional modules within the update control module 140, according to one embodiment of the present invention.

FIG. 3 is a high-level block diagram illustrating the functional modules within the update control module 140, according to one embodiment of the present invention. The update control module 140, in the embodiment illustrated in FIG. 3, includes a sending module 302, a receiving module 304, a tracking module 306, and a failure determination module 308. Those of skill in the art will recognize that other embodiments can have different and/or additional modules than those shown in FIG. 3 and the other figures. Likewise, the functionalities can be distributed among the modules in a manner different than described herein.

The sending module 302 sends software updates 120 to a plurality of computers. For example, the sending module 302 on update server 116 can send updates 120 to a plurality of client computers 110. These software updates 120 install update check programs 122 (e.g., small piece of software) on each of the computers 110. The updates 120 can also configure the update check programs 122 to execute at a particular later time, such as a specified reporting time after installation of the update check program 122 or after the installation of the software update 120. For example, the update check programs 122 can be configured to execute 30 minutes after the update check program is installed, or some other amount of time (e.g., 15 minutes, 45 minutes, 1 hour, 1½ hours, 2 hours, 12 hours, 24 hours, 48 hours, etc). The local operating system scheduling mechanism can be used to schedule the reporting time, or some other mechanism can be used that allows the setting of designated time(s) over a time period.

The receiving module 304 receives from a plurality of the update check programs 122 a positive operations notification at the specified reporting time indicating that the update check programs 122 are okay or that the update is functioning properly. However, these positive operations notifications will only be received by computers that have not had a catastrophic failure that prevents the sending of such a notification. In other words, if the computer system 110 continues to execute until the scheduled reporting time, the update check program 122 executes and sends a notification back to the update server 116 or to some other tracking entity that all is well. Thus, as of the scheduled reporting time, the update 120 sent has not caused a sufficiently significant error in the system that the entire system crashed or otherwise was disabled and unable to reboot.

As described previously, there are existing approaches that monitor the application after the update has been sent out. If there are any problems, these monitor programs send back reports of those problems or the user is sent a request to report the problem. For example, if the computer crashes, once the computer is rebooted, the monitor programs or the user send out a report of the crash to an entity tracking these problems. However, if there is a catastrophic failure in the computer 110 that prevents it from rebooting, it is not possible for any such problem reports to be sent out. The tracking entity thus believes everything is functioning well since no problems have been reported, when in fact the computer 110 has been disabled to a degree that prevents reporting of such problems. The update control module 140, in contrast, is configured specifically to recognize these catastrophic failures since it receives positive operations notifications, indicating everything is okay, at specified times or time windows. If the update 120 is causing catastrophic failures in the computers 110 such that no operations notifications can be sent, the module 140 will recognize that it is not receiving a sufficient number positive operations notifications at the designated times, and will detect that the update 120 may be causing significant problems in the computers 110. The module 140 can thus prevent any further updates 120 from being sent out, and avoid further catastrophic problems.

In some embodiments, the software update 120 configures the update check program 122 to send multiple positive operations notifications at a number of specified reporting times separated by intervals of time. For example, the update check program might sent a notification 10 minutes after installation, then another notification at 30 minutes, then a third at 1 hour and maybe a fourth at 2 hours. In this manner, if the update check program 122 misses one notification for some reason, the receiving module 304 could wait to see if it misses the next notification too. If it misses two notifications in a row, this suggests there is more likely a problem. The update check program 122 can be configured to stop sending notifications after a defined period of time (e.g., after 3 days, after 1 week, after 2 weeks, etc.). For example, if the user shuts down the computer 110 for three weeks, when the user finally turns the computer back on, the program 122 can be designed to cancel any further reports. By this time, the update rollout may be complete, and all problems detected, so the report may no longer be needed.

The intervals between each reporting time can vary for different updates. For example, if the rollout of the update 120 is planned to occur quickly, the reporting time intervals will be shorter since it will be necessary to get a report back and detect any problems before a next round of updates is sent out. As one example, if the updates 120 are being sent in groups at every 30 minutes, the update check programs 122vcan send out reports every 10 or 20 minutes so that a few reports will have occurred already before the second round of updates is to be sent. In some embodiments, the update check program 122 removes itself from the computer 110 after it has finished sending its notification(s), though this is not required.

In some embodiments, the receiving module 304 receives from one or more of the update check programs 122 a partial positive operations notification indicating that the update check programs 122 are okay so far, but the user is temporarily disabling the computer 110. For example, the user might shut down the computer 110, disconnect it from the network, or otherwise temporarily disable the computer 110. While the computer 110 is temporarily disabled, the update check program 122 will be unable to send out its positive operations notification(s) at the designated time(s). To avoid having the update control module 140 recognize this as an indication of a catastrophic failure, the update check module 140 can send out an "okay so far, user shutting down" notification (or something similar) right before the temporary disabling occurs. The module 140 is thus made aware that the update check program 122 will be out of contact for a while, and may miss one or more scheduled reporting times. However, the module 140 also knows based on the partial report that so far there is not a problem. In some embodiments, the update check program 122 is configured to send out a notification soon after the computer 110 is enabled again so the module 140 will again be expecting positive operations notifications at the scheduled times.

The tracking module 306 tracks the number of positive operations notifications (which can include partial positive notifications) received in comparison to the number of the software updates sent. The module 306 can track the number of notifications received within the expected time window(s). For example, if 1000 updates were sent out and the module 306 expects notifications from the update check modules 122 at a reporting time of 30 minutes later, the module 306 can track if only 10 notifications (either positive or partial positive) were received, substantially fewer than expected. This indicates that the update could be causing catastrophic failures in the computers 110. It is expected that there will not necessarily be a one-to-one correlation between the number of updates sent and the number of positive notifications received, even with an update that is not problematic. There may be some number of computers 110 that are suddenly or unexpectedly disabled such that the update check programs 122 on those computers 110 are unable to send out the partial positive notification before disabling. For example, there may be a power outage, the user might hit the power switch on the computer 110, the computer 110 could lose Internet 112 connectivity, and so forth. While these problems are not update-related and not catastrophic failures, they still may prevent the update check program 122 from sending its report.

The tracking module 306 can account for these problems by expecting that some number of update check programs 122 will not report back. In some embodiments, the tracking module 306 can refer to information regarding prior updates sent out by the update server 116 to statistically determine if the rate of response from the update check programs 122 likely indicates a problem. The module 306 can determine if this update's rate of failure is similar to, more, or less than previous updates sent.

In some embodiments, the positive operations notification sent by a given update check program includes an identifier (e.g., a unique ID, serial number, checksum, or some other identifier) for identifying the software update that installed the given update check program. In these embodiments, the tracking module 306 can actually keep track of which notifications came from what update packages based on the identifier. In some embodiments, the identifier can include various types of information about the package beyond just an ID number that provides the module 306 with relevant tracking data.

The failure determination module 308 determines whether the software updates sent are causing catastrophic failures in the computers based on results of the tracking. If the number of positive notifications received is small relative to the number of updates sent, the module 308 determines that the update is likely causing a significant problem resulting in a high rate of catastrophic failures. For example, the module 308 can detect a problem if the number of notifications received is only 80% of the number of updates sent (or is only 75% or 50% or 35% or 20%, etc.). The number may vary based on different factors. For example, over the holidays or over a weekend, it may be expected that more computers will be shut down, so fewer notifications will be sent even though the update has not caused a catastrophic problem). In some embodiments, the module 308 will recognize that there is a problem if the number of positive operations notifications is below an expected threshold number of positive operations notifications that should be received by the specified reporting time.

In some embodiments, there are different threshold numbers associated with each specified reporting time of the update check programs 122. For example, earlier specified reporting times (e.g., 30 min) may be expected to have a higher rate of report backs, whereas later reporting times (e.g., 18 hours) may have a lower rate. The module 308 can recognize that, for example, a 90% report back rate is expected at a 1 minute specified reporting time, while only a 60% report back rate may be expected after 1 day, since the user is likely to still have the computer 110 running right after receiving the update (e.g., 1 minute after), but may have shut down the computer 24 hours later (e.g., 1 day after). If the module 308 determines there is likely a problem, the module 308 can take action to prevent the software updates 120 from being sent to additional computers.

Figure 4:
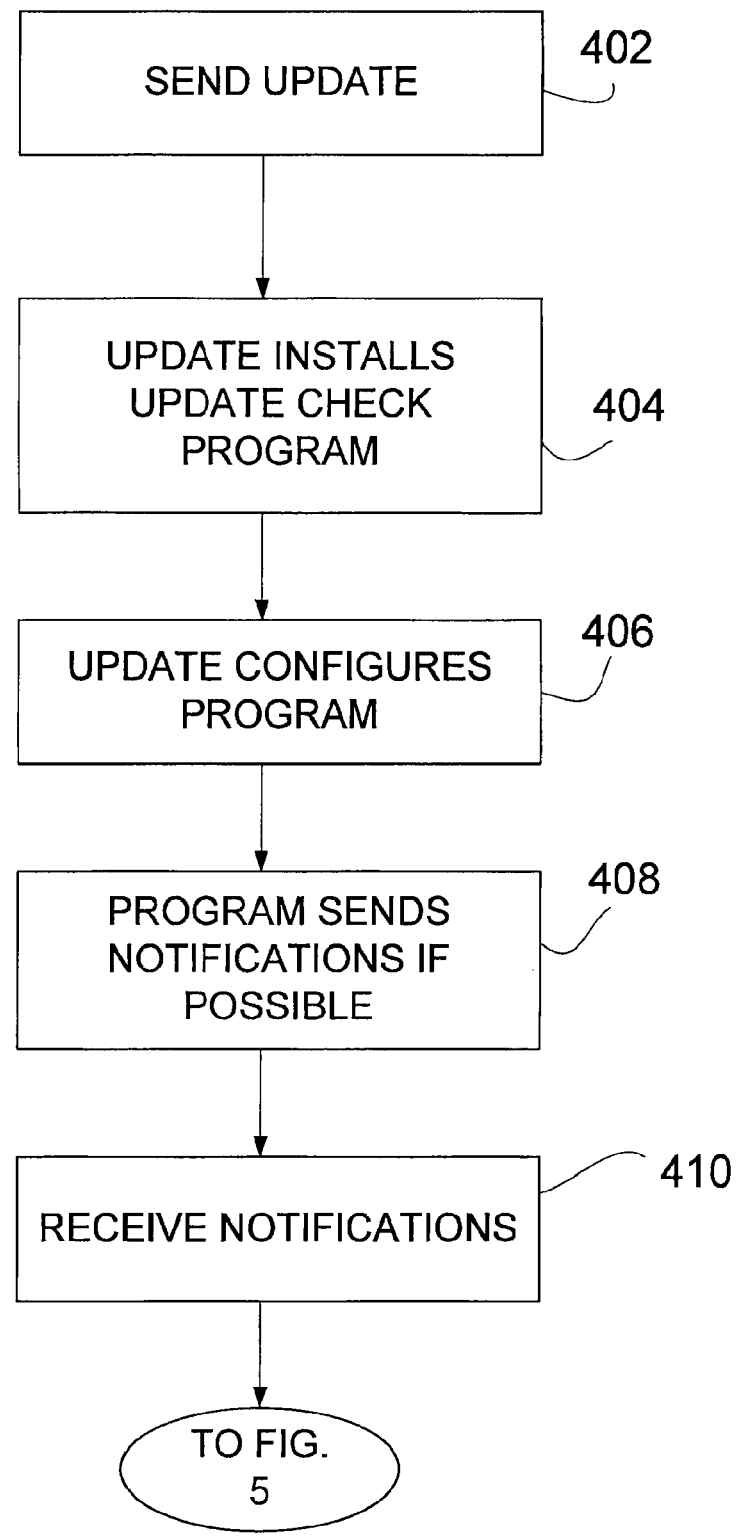
FIG. 4 is a flowchart illustrating steps performed to measure catastrophic failure rates in software updates including sending updates and receiving notifications, according to one embodiment of the present invention.

Referring now to FIG. 4, there is shown a flowchart illustrating the operation of the update control module 140, according to some embodiments of the present invention. Specifically, FIG. 4 illustrates the steps of the update control module 140 involving sending the update 120 and receiving notifications. It should be understood that these steps are illustrative only. Different embodiments of the update control module 140 may perform the illustrated steps in different orders, omit certain steps, and/or perform additional steps not shown in FIG. 4 (the same is true for FIG. 5).

As shown in FIG. 4, the update control module 140 sends 402 software updates 120 to a plurality of computers. The software updates 120 sent install 404 update check programs on each of the computers. The software updates 120 configure 406 the update check programs 122 to execute at a specified reporting time after the update check program installation. The update control module 140 receives 408 from a plurality of the update check programs 122 a positive operations notification at the specified reporting time indicating that the update check programs 122 are okay.

Figure 5:
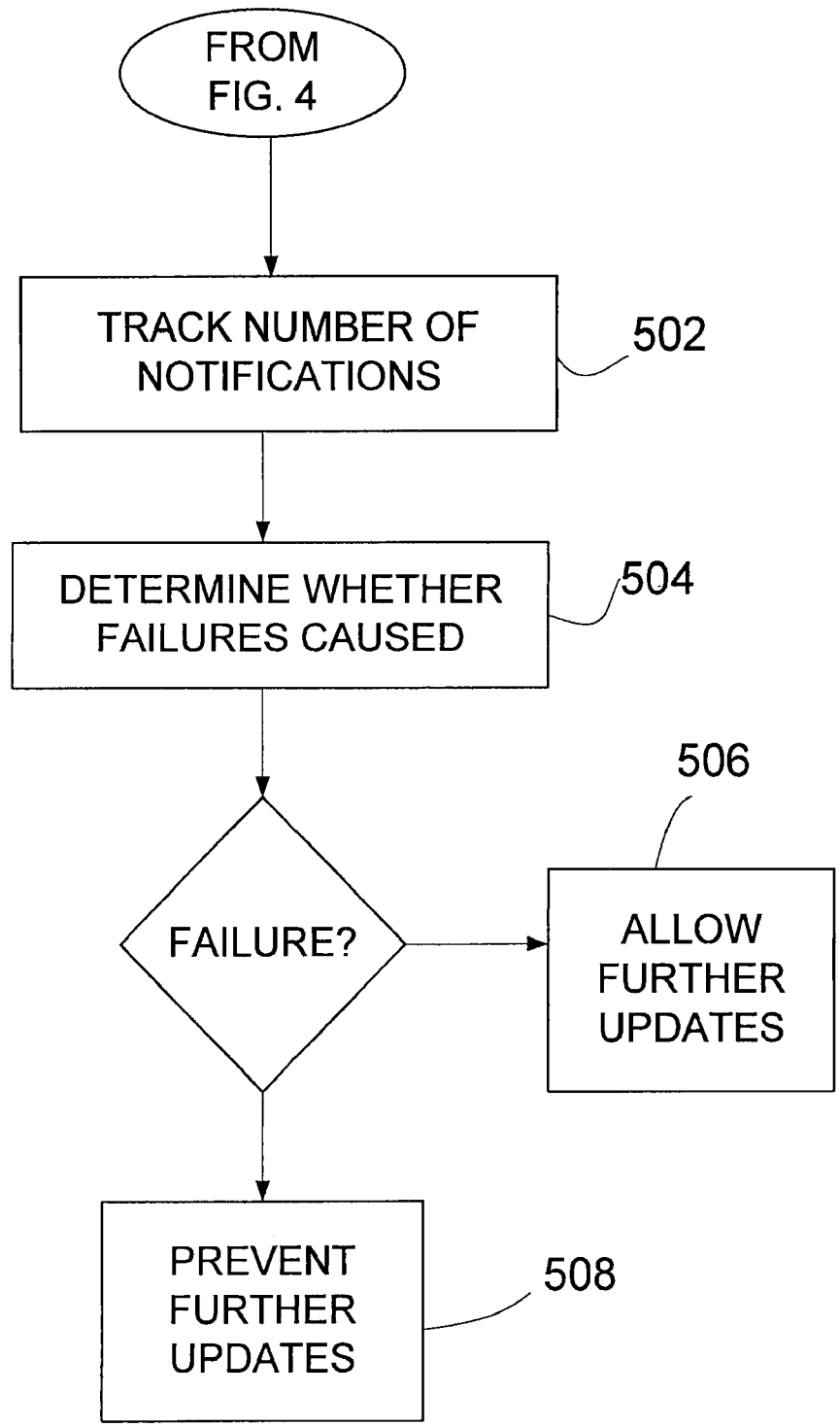
FIG. 5 is a flowchart illustrating steps performed to measure catastrophic failure rates in software updates including tracking notifications and determining whether failures were caused, according to one embodiment of the present invention.

Referring now to FIG. 5, there is shown a flowchart illustrating the operation of the update control module 140, according to some embodiments of the present invention. Specifically, FIG. 5 illustrates the steps of the update control module 140 involving tracking notifications and determining whether failures were caused.

As shown in FIG. 5, the update control module 140 tracks 502 the number of positive operations notifications received in comparison to the number of the software updates sent. The module 140 determines 504 whether the software updates sent are causing catastrophic failures in the computers based on results of the tracking. If the module 140 determines that the update 120 is causing catastrophic failures in the computers 110 that received that update 120, the module 140 can take corrective action to avoid causing more failures. For example, the module 140 stop sending updates, or can notify another module on the server 116 to prevent the sending of further updates.

As used herein any reference to "one embodiment," "an embodiment," or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product for measuring a catastrophic failure rate in software updates, the computer program product comprising a non-transitory computer-readable storage medium containing executable computer program code for performing a method comprising:

sending software updates to a plurality of computers, the software updates installing update check programs on the computers and configuring the update check programs to execute at a specified reporting time after the update check program installation;

receiving from a plurality of the update check programs a positive operations notification at the specified reporting time indicating that the update check programs are okay;

tracking the number of positive operations notifications received in comparison to the number of the software updates sent;

detecting a high catastrophic failure rate for the software updates responsive to the number of positive operations notifications received being below an expected threshold number of positive operations notifications that should be received by the specified reporting time; and determining whether the software updates sent are causing catastrophic failures in the computers based on the detection of a high catastrophic failure rate.

2. The computer program product of claim 1, wherein the software update configures the update check program to send a plurality of positive operations notifications at a plurality of specified reporting times separated by time intervals, the notifications ending after a defined period of time.

3. The computer program product of claim 1, wherein receiving a positive operations notification further comprises receiving from one or more of the update check programs a partial positive operations notification indicating that the update check programs are okay so far, the partial notification being sent in response to a user of the computer temporarily disabling the computer.

4. The computer program product of claim 1, wherein the determining step further comprises:

taking corrective action to avoid causing more catastrophic failures in computers.

5. A computer-implemented method of measuring a catastrophic failure rate in software updates, the method comprising:

sending software updates to a plurality of computers, the software updates installing update check programs on each of the computers and configuring the update check programs to execute at a specified reporting time after the update check program installation;

receiving from a plurality of the update check programs a positive operations notification at the specified reporting time indicating that the update check programs are okay;

tracking the number of positive operations notifications received in comparison to the number of the software updates sent;

detecting a high catastrophic failure rate for the software updates responsive to the number of positive operations notifications received being below an expected threshold number of positive operations notifications that should be received by the specified reporting time; and determining whether the software updates sent are causing catastrophic failures in the computers based on the detection of a high catastrophic failure rate.

6. The method of claim 5, wherein the software update configures the update check program to send a plurality of positive operations notifications at a plurality of specified reporting times separated by time intervals, the notifications ending after a defined period of time.

7. The method of claim 5, wherein receiving a positive operations notification further comprises receiving from one or more of the update check programs a partial positive operations notification indicating that the update check programs are okay so far, the partial notification being sent in response to a user of the computer temporarily disabling the computer.

8. The method of claim 5, wherein a catastrophic failure is an error in the computer resulting in the computer crashing and being unable to reboot after crashing or resulting in disabling of network access by the software update.

9. The method of claim 5, wherein the determining step further comprises:

preventing the software updates from being sent to additional computers.

10. A computer system measuring a catastrophic failure rate in software updates sent by an update server, the system comprising:
- a processor;
- a non-transitory computer-readable storage medium storing software modules for execution by the processor, the modules comprising:
  - a sending module for sending software updates to a plurality of computers, the software updates installing update check programs on each of the computers and configuring the update check programs to execute at a specified reporting time after the update check program installation;
  - a receiving module for receiving from a plurality of the update check programs a positive operations notification at the specified reporting time indicating that the update check programs are okay;
  - a tracking module for tracking the number of positive operations notifications received in comparison to the number of the software updates sent; and
  - a failure determination module for:
    - detecting a high catastrophic failure rate for the software updates responsive to the number of positive operations notifications received being below an expected threshold number of positive operations notifications that should be received by the specified reporting time; and
    - determining whether the software updates sent are causing catastrophic failures in the computers based on the detection of a high catastrophic failure rate.

11. The system of claim 10, wherein the positive operations notification sent by a given update check program includes an identifier for identifying the software update that installed the given update check program.

12. The system of claim 10, wherein the update check program is configured to send a plurality of positive operations notifications at a plurality of specified reporting times separated by time intervals, the notifications ending after a defined period of time.

13. The system of claim 10, wherein at least one of the positive operations notifications received is a partial positive operations notification indicating that the update check programs are okay so far, the partial notification being sent immediately before the computer is temporarily disabled.

14. The system of claim 10, wherein a catastrophic failure is an error in the computer that prevents the computer from being able to send any type of operations notifications to the update server.

15. The system of claim 10, wherein the failure determination module is further configured for:
- preventing the software updates from being sent to additional computers.

16. A computer system for measuring a catastrophic failure rate in software updates, the system comprising:
- a processor;
- a non-transitory computer-readable storage medium storing an update control module for execution by the processor, the update control module for:
  - sending software updates to a plurality of computers, the software updates installing update check programs on each of the computers and configuring the update check programs to execute at a specified reporting time after the update check program installation;
  - receiving from a plurality of the update check programs a positive operations notification at the specified reporting time indicating that the update check programs are okay;
  - tracking the number of positive operations notifications received in comparison to the number of the software updates sent;
  - detecting a high catastrophic failure rate for the software updates responsive to the number of positive operations notifications received being below an expected threshold number of positive operations notifications that should be received by the specified reporting time; and
  - determining whether the software updates sent are causing catastrophic failures in the computers based on the detection of a high catastrophic failure rate.

17. The system of claim 16, wherein a catastrophic failure is an error in the computer that prevents the update check programs from being able to send any type of operations notifications.

* * * * *